United States Patent [19]

Bedder et al.

[11] Patent Number: 4,622,277
[45] Date of Patent: Nov. 11, 1986

[54] ELECTROCHEMICAL CELLS

[75] Inventors: Paul L. Bedder, Hickory, N.C.; Peter R. Moses, Windham, N.H.; Bhupendra Patel, Hickory, N.C.; Terrence F. Reise, Sudbury; Alwyn H. Taylor, Wellesly Hills, both of Mass.

[73] Assignee: Duracell Inc., Bethel, Conn.

[21] Appl. No.: 781,836

[22] Filed: Sep. 30, 1985

[51] Int. Cl.$^4$ .............................................. H01M 4/00
[52] U.S. Cl. ............................................ 429/94; 429/7; 429/121; 429/196
[58] Field of Search ................. 429/94, 234, 228, 220, 429/221, 223, 219, 218, 196, 121, 122, 7

[56] References Cited
U.S. PATENT DOCUMENTS

| | | | |
|---|---|---|---|
| 3,900,340 | 8/1975 | Greaser et al. | 429/94 |
| 4,049,882 | 9/1977 | Beatty | 429/94 |
| 4,184,012 | 1/1980 | Barrella | 429/94 |
| 4,482,615 | 11/1984 | Rosansky et al. | 429/94 |

Primary Examiner—Charles F. LeFevour
Attorney, Agent, or Firm—Ronald S. Cornell

[57] ABSTRACT

This invention provides a design for spirally wound electrochemical cells which improves their safety during abuse such as voltage reversal. The invention comprises coupling a first segment of inert conductive metal to the cathode and a dendrite target comprised of an inert conductive metal to the anode. When these electrodes are spirally wound together the two segments of inert conductive metal face each other, held in physical separation by the separator, whereby during voltage reversal a dendrite grows from said first segment to said dendrite target.

15 Claims, 9 Drawing Figures

U.S. Patent    Nov. 11, 1986    Sheet 1 of 3    4,622,277
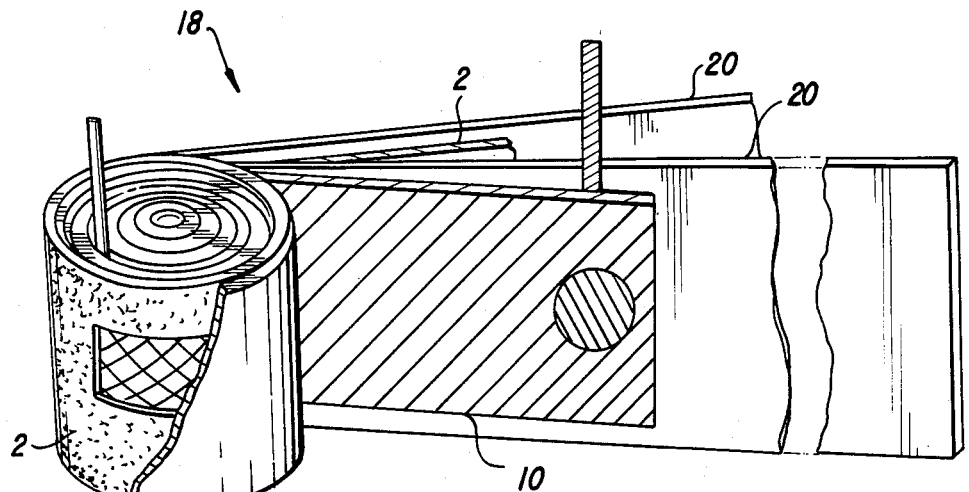
FIG. 1
FIG. 2
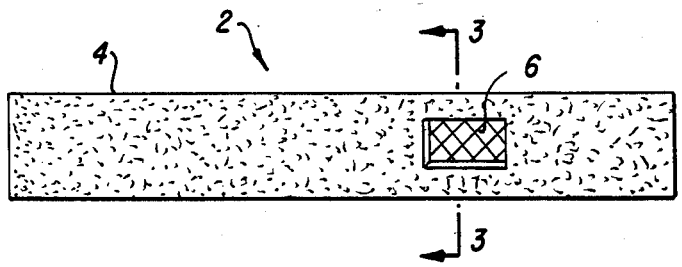
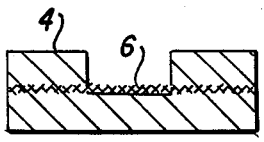
FIG. 3
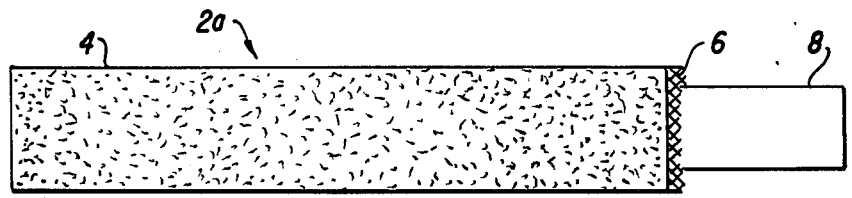
FIG. 4

ELECTROCHEMICAL CELLS

This invention relates to non-aqueous electrochemical cells, particularly those subject to damage during voltage reversal abuse. More specifically, this invention pertains to high energy density cells having metal foil anodes comprised of alkali or alkaline earth metals. The cathodes for such cells generally fall into two groups. The first group consists of those cathodes which are comprised of the cathode active material that is reduced during discharge. The second group is comprised of those cathodes which just act as a catalytic surface on which the liquid cathode active substance, contained in the electrolyte, is reduced.

The high energy density of these cells permits high currents to be drawn from them, particularly when the electrodes are spirally wound together. Such a cell design, while permitting high current drains, is susceptible to being rendered unsafe during certain types of abuse. One such type of abuse arises when two or more cells are connected in series. In practice it is very difficult to manufacture cells having identical capacities. Therefore when cells are discharged in series it is possible that one cell will exhaust its capacity before the others. Under this condition, when one cell's capacity is nearly exhausted, it can be driven into voltage reversal by the other cell or cells in series. When a cell is in voltage reversal there are electrochemical reactions that take place which can generate heat and lead to cell bulging or venting.

The object of the present invention is to provide a design feature in spirally wound electrochemical cells which prevents the cells from bulging or venting during voltage reversal abuse.

The objects, features, and advantages of this invention will be demonstrated in the examples and figures that follow, in which;

FIG. 1 is a prospective view of a jelly roll structure comprising the internal components of an electrochemical cell made in accordance with the invention, said jelly roll structure shown partially unwound.

FIG. 2 is a side view of a cathode structure.

FIG. 3 is taken along the line 2—2 in FIG. 2.

FIG. 4 is a side view of an alternate cathode structure.

Figure 5:
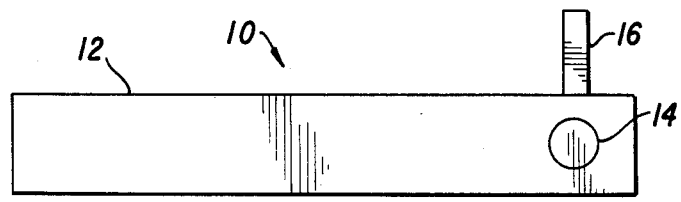
FIG. 5 is a side view of an anode structure.

The invention relates to a new design feature for enhancing the abuse resistance of non-aqueous spirally wound cells having an alkali or alkaline earth metal anode. The design feature comprises a first segment of exposed inert conductive metal coupled mechanically and electrically to the cathode and a dendrite target comprised of a second segment of exposed inert conductive metal coupled mechanically and electrically to the anode. Inert is intended to mean that the metal does not react detrimentally with the components of the cell. When these electrodes are spirally wound, the two pieces of inert metal are oriented such that they face each other and are held in physical isolation by the separator which is interposed therebetween. During voltage reversal abuse dendrites grow from the first segment of inert metal to the dendrite target thereby creating a low resistance pathway between the two pieces of inert metal. This prevents the potentially detrimental intermixing of anode material onto the cathode and provides a shunt for the current to pass through the reversed cell without generating excessive heat. The result is a much safer cell than if the invention is not used.

FIG. 1 shows a substantially totally assembled spirally wound electrode package 18. This embodiment incorporates the cathode structure 2 and the anode structure 10 of FIGS. 2 and 5 respectively. The separator 20 has been partially cut away to reveal the region of the cathode structure where the cathode material has been removed to expose the conductive metal grid. When this electrode package 18 is totally wound the dendrite target coupled to the anode lies directly across from the exposed conductive metal grid, but held in physical isolation by the separator 20. The size of the dendrite target should be such that when lying in opposition to the exposed conductive metal grid it does not extend beyond the perimeter thereof.

FIG. 2 shows a cathode structure 2 comprised of the cathode material 4 compressingly adhered to a conductive metal grid 6. The cathode structure 2 has a region on one side where the cathode material has been removed in order to expose the conductive metal grid. This region should not be greater than 5% or less than 1% of the cathode surface area. The efficaciousness of the invention is improved when the cathode material is removed from just one side. Although shown as a square the shape can be any other geometric shape. This region of exposed current collector grid serves as the piece of inert metal coupled to the cathode.

FIG. 3 shows a cross section of the cathode structure 2 in FIG. 2 viewed along the line 2—2. This figure shows where the cathode material has been removed from just one side of the cathode structure, baring the cathode current collector. The figure also shows that the current collector grid is a mono-layer that is embedded within the compressingly adhered cathode material.

FIG. 4 is an alternate cathode structure 2a. The structure is comprised of cathode material 4 compressingly adhered to the conductive metal grid 6. One end of the cathode structure has had the cathode material removed in order to couple a segment of inert metal to the exposed current collector grid.

FIG. 5 shows an anode structure 10 comprised of a foil of anode material 12 onto which is attached an anode tab 16 and a dendrite target 14. The dendrite target is shown as a circle but the shape is not limited to a circle. It can be any shape which does not have any sharp corners which can potentially puncture through the separator and short out the electrodes. For example, a rectangular shape with rounded corners, or a washer shape, or a circular shape with radial extensions would also work. The surface area of the dendrite target 14 should be less 5% of the anode surface area and less than the surface area of the bared conductive metal grid of the cathode shown in FIG. 1. One reason that the surface area of the target should be less than the surface area of the bared metal grid is that some of the anode surface must face the bared metal grid to ensure adequate dendrite growth. The anode surface that is peripheral to the target is the source of ions of anode material which get reduced to form the dendrite. The practical limitations on the thickness of the dendrite target are that it should be at least 1 mil thick but no greater than one half of the cathode thickness. The anode tab 16 and the inert metal 14 are aligned one behind the other with the anode foil 12 interposed therebetween.

Figure 6:
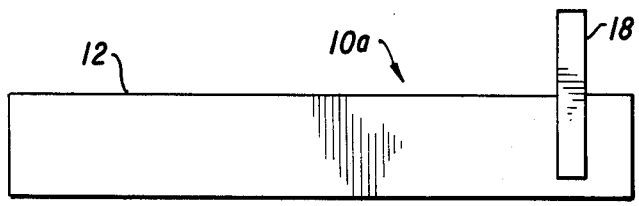
FIG. 6 is a side view of an alternate anode structure.

FIG. 6 shows an anode structure 10a comprised of a foil of anode material 12 onto which is attached an anode tab of inert metal material which also serves as the dendrite target.

Figure 7:
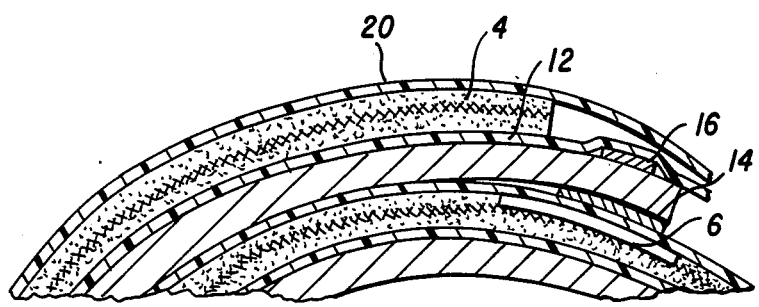
FIG. 7 is a cross section through the middle of the spiral wound electrode structure, in the region where the present invention is incorporated, shown in FIG. 6.

FIG. 7 is a cross section through the center of the electrode structure in FIG. 6 perpendicular to the longitudinal axis. The figure shows the orientation of the inert metal 6 coupled to the cathode material relative to the dendrite target 14 coupled to the anode when the cell structure is fully wound. It is across the gap between the conductive metal grid 6 and the dendrite target 14 that the dendrite of anode material forms during voltage reversal.

Figure 8:
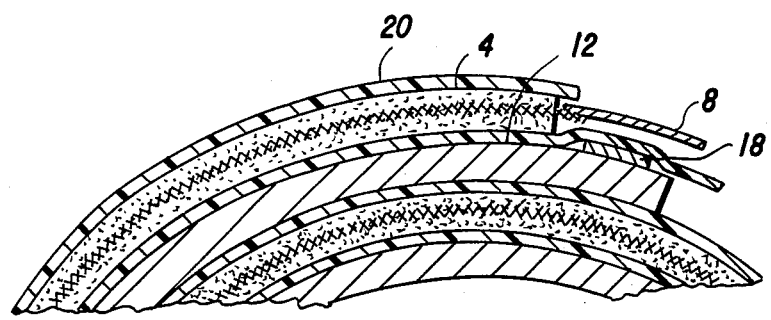
FIG. 8 is a cross section through a spirally wound electrode structure which uses an alternate embodiment of the presently disclosed invention.

FIG. 8 is a cross section through the center of a spirally wound electrode structure similar to FIG. 6 except that the cathode structure is the one shown in FIG. 3 and the anode structure is the one shown in FIG. 5. In this embodiment it is the gap between the inert metal 8 and the dendrite target/anode tab 16, which is comprised of an inert metal, that is bridged by the dendrites of anode material.

The preferred lengths of the anode and the cathode are such that the cathode forms substantially the entire outer wrap of the spirally wound electrode structure with just a short segment of the anode protruding from between the first and second outermost spirals of cathode as shown in FIGS. 7 and 8. This segment of anode should not exceed 25% of the circumference of the spirally wound electrode structure. It is on this segment of anode, specifically the side facing the inert metal coupled to the cathode, that the dendrite target is located. This segment is the preferred location because it actually becomes severed from the rest of the anode toward the end of discharge and during voltage reversal. The severing occurs because this segment of anode is utilized at one half the rate of the rest of the anode since it has cathode only on one side while the rest of the anode has cathode on both sides. This severing process concentrates the current passing through the cell in the region where the inert metals are located and ensures that the dendrite bridge will be between the inert metals and not between the active materials of the anode and cathode. It is this latter, potentially detrimental, event which the present invention prevents from happening. While this is the preferred embodiment it is not necessary, for the invention to work, that there be any protruding length of anode. In this case the dendrite target could be located anywhere on the anode provided that the segment of inert metal coupled to the cathode lies across from said target.

It is desirable, in spirally wound cells of the type discussed, to balance the coulombic capacity of the anode with the coulombic capacity of the cathode, while taking into account inefficiencies in the discharge of the cathode. By thus matching the coulombic capacities of the electrodes the effect toward the end of discharge is that the anode becomes thin and sections can become electrically isolated. Therefore, in order to provide a safe cell which can also deliver full capacity, it is preferrable to use this invention along with a means for maintaining electrical contact down the length of the anode. A preferred means is taught in U.S. Pat. No. 4,184,012. The means taught in this patent is preferrable over any other means since it does not require any additional materials to be added to the cell which would take up volume that could otherwise be filled with active materials. From this point of view it is undesirable to use expanded metal grids, metal strips, or wires to effect electrical continuity.

In order to illustrate the efficacy of the present invention the following examples are presented. It is understood that such examples are for illustrative purposes only and that details contained therein should not be construed as limitations on the present invention.

COMPARATIVE EXAMPLE A

Figure 9:
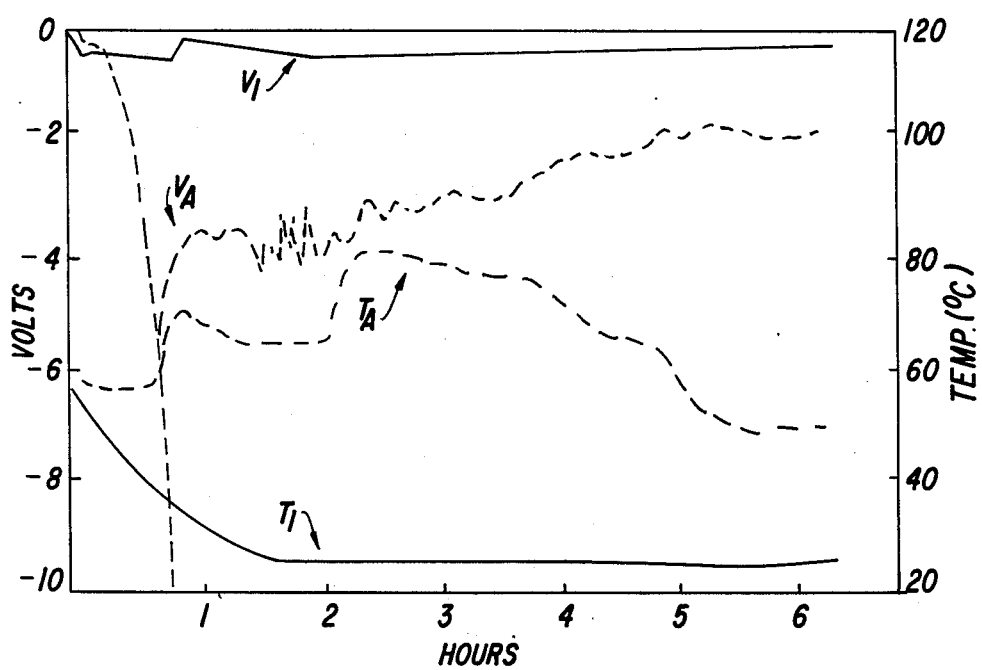
FIG. 9 is a graph showing the voltage and temperature characteristics of a cell comprising this invention as compared to a prior art cell.

An electrochemical cell was built comprised of a lithium anode and a carbon cathode, said cathode being comprised of carbon compressingly adhered to an expanded aluminum grid. These were spirally wound together with a 1 mil polypropylene separator interposed there between. The lengths of these electrodes were such that the spirally wound electrode structure had approximately 0.75" of anode protruding from between the first and second outermost spirals of cathode. The outer face of this section of anode had an anode tab, comprised of a nickle strip, attached thereon. The cathode tab was comprised of aluminum and was attached to the aluminum grid. The spirally wound electrode structure was then assembled into an electrochemical cell, with said anode tab connected to the negative terminal and said cathode tab attached to the positive terminal. The nonaqueous electrolyte used was comprised of $SO_2$, acetonitrile, and a lithium salt. The cell's capacity was removed by discharging at 2 amps until the cells voltage reached zero. Voltage reversal was achieved by then forcing a 1 amp current through the cell by a constant current power supply. FIG. 9 shows the voltage and temperature of this cell, designated $V_A$ and $T_A$ respectively, during the 1 amp forced discharge/voltage reversal test. During the first 0.75 hours the voltage drops to a somewhat erratic negative voltage with significant negative voltage spikes causing the cell to heat up. After two hours the cell temperature had risen to 80 C. This heating caused the cell to bulge from the rise in internal pressure and finally the cell vented and released liquid and gaseous materials.

EXAMPLE 1

An electrochemical cell was built identical to the previous example except that the cathode had an area 0.75"×0.75" where the carbon was scraped off one side to expose the aluminum metal grid. This exposed grid served as the inert conductive metal coupled to the cathode. The anode had a disc of copper 0.5" in diameter and 2 mil thick cold welded on one side of the anode length which protrudes from between the first and second outermost spirals of cathode. Specifically, the copper disc was located on the side of the anode which faces the interior of the cell. A nickel tab was located directly behind the copper on the other side of the anode length. The copper disc serves as the dendrite target. In this design the copper disc faces the exposed area of the aluminum grid on the cathode, with the separator holding them in physical isolation. This cell was subjected to the voltage reversal test described in the previous example. The voltage and temperature of this cell during reversal, designated $V_1$ and $T_1$ respectively, are shown in FIG. 9. Contrary to the previous example the voltage of the cell was clamped at a value between 0 and $-0.5V$ throughout the test. The cell temperature dropped continuously throughout the test. The result was a very safe cell, to be distinguished from the prior art cell.

EXAMPLE 2

An electrochemical cell was built identical to Comparative Example A except that the cathode had a scraped area on one side measuring 0.75"×1.25", where the 1.25" dimension is identical to and coincident with the width of the cathode. The anode tab also served as the anode target. As such, a nickel strip which was 5 mil thick, 0.25" wide, and long enough to connect to the negative terminal, was attached to the inner face of the anode length which protrudes from between the first and second outermost cathode spirals. This location oriented the nickel stip to face the exposed area of the aluminum grid, held in physical isolation by the separator. This cell was subjected to the voltage reversal test described in the previous examples. The voltage and temperature of this cell during reversal were similar to those of Example 1. The temperature of this cell dropped throughout the test, maintaining the cell in a safe condition.

EXAMPLE 3

An electrochemical cell was built identical to Comparative Example A except that an inert conductive metal was coupled to the cathode, said metal being a length of titanium welded to the metal grid at the exterior terminus of the cathode. The titanium was 0.5" wide, 4 mil thick, and of sufficient length to extend beyond the end of the length of the anode which protrudes from between the first and second outermost spirals of cathode. The anode tab, comprised of a nickel strip as in the previous example, is located on the outer face of the protruding length of anode so that it serves the dual purpose of both tab and dendrite target. This design has the nickel strip and the titanium segment facing each other with the separator holding them in physical isolation. This cell was subjected to the voltage reversal test described in the previous examples. The voltage and temperature of this cell during reversal were similar to those of Example 1. The voltage of this cell was clamped between 0 and $-0.5V$ throughout the test while the temperature continuously dropped. This design is equally efficacious in providing a safe cell as the previous two examples.

EXAMPLE 4

An electrochemical cell was built identical to the previous example except that the inert conductive metal coupled to the cathode in this case was a length of aluminum welded to the metal grid at the exterior terminus of the cathode. The aluminum was 3/16" wide, 10 mil thick, and of a length sufficient to extend beyond the end of the length of anode which protrudes from between the first and second outermost spirals of cathode. A nickel tab was located on the anode as in the previous example, as such the tab served as the dendrite target. This cell was subjected to the voltage reversal test described in the previous examples. The voltage and temperature of the cell during reversal were similar to those of example 1. The voltage of the cell was clamped between 0 and $-0.5$ V throughout the test while the temperature continuously dropped. This, and the previous examples, clearly demonstrate that the nature of the metals coupled to the cathode and anode can be varied and still remain within the scope of this invention.

COMPARATIVE EXAMPLE B

This example employed two lithium/$MnO_2$ cells connected in series. When one of these cells has half of its capacity removed prior to assembly into a battery, it will be driven into voltage reversal by the other cell when these cells are discharged in series at a moderate rate. A design was employed similar to the previous examples with a short length of anode protruding from between the first and second outermost spirals of cathode. The anode tab, comprised of a nickel strip 5 mil thick, 0.25" wide, and long enough to connect to the negative terminal, is attached to the outer surface of this short length of anode. When this battery is discharged through a 3 ohm resister the fully charged cell drives the 50% discharged cell into voltage reversal. After the cells are totally discharged the voltage reversed cell was disassembled. On the area of the cathode across from the length of anode which protrudes from between the first and second outermost spirals of cathode there was a heavy deposit of lithium. This is a very hazardous situation since very little is required to cause the lithium deposit to react with the cathode it is plated on and cause the cell to vent or even catch fire.

EXAMPLE 5

Two electrochemical cells were built having the electrode lengths, the separator, and the electrolyte identical to the previous example. However, the cell to be 50% discharged, and ultimately to be driven into voltage reversal, had a segment of aluminum attached to the exterior end of the cathode. The aluminum was 0.9×0.9 in. which permitted it to extend beyond the end of the lithium which protrudes from between the first and second outermost spirals of cathode. The anode tab, comprised of nickel and which also served as the dendrite target, was located on this section of anode, on the side facing the segment of aluminum. The two cells were connected in series and discharged through a 3 ohm resistor. After the cells were totally discharged the voltage reversed cell was disassembled. In contradistinction to the previous example there was virtually no lithium on the cathode and the bulk of it was on the aluminum segment. Since there is no hazard of having lithium on aluminum the cell was in a very safe condition. In fact the lithium alloys with the aluminum which further deactivates the lithium.

In the previous examples the inert metals used as dendrite targets were copper and nickel. Other metals which would work include stainless steel, nickel plated cold rolled steel, and cold rolled steel. The inert metals which can be used to couple to the cathode include titanium, tantalum, niobium, stainless steel, nickel, and those metals which can alloy with lithium such as aluminum.

The previous examples employed the presently disclosed invention in Li/$MnO_2$ cells and Li/$SO_2$ cells. However, the nature of the invention would work for any cathode. Classes of suitable cathodes include metal oxides, carbon fluorides, metal sulfides, transition metal polysulfides, metal halides such as $CFx$, $V_2O_5$, $WO_3$, $MoO_3$, $MoS_2$, lead oxides, cobalt oxides, copper oxides, $CuS$, $CuS_2$, $In_2O_3$, iron sulfides, $NiS$, $Ag_2CrO_4$, $Ag_3PO_4$, $TiS_2$, transition metal polysulfides, $CoCl_2$, $NiCl_2$, $FeBr_3$, $PbCl_2$, $CuCl_2$, $CuBr_2$, and mixtures thereof. The present invention would also work for cells having cathodes comprised of carbon and nonaqueous electrolytes comprising cathode active materials such as $SOCl_2$ and $SO_2Cl_2$.

The previous examples employed anodes comprised of lithium. However the invention would work for other alkali or alkaline earth metal anodes including sodium, potassium, magnesium, and aluminum.

The previous examples are intended to be illustrative of the presently disclosed invention. It is to be understood that deviations can be made but still remain within the scope of the presently disclosed invention.

What is claimed is:

1. An electrochemical cell having a positive terminal, a negative terminal, and at least two electrodes comprising:
    an anode connected to the negative terminal;
    a cathode connected to the positive terminal;
    a separator interposed between said anode and cathode;
    a nonaqueous electrolyte;
    a first segment of exposed inert conductive metal coupled mechanically and electrically to the cathode; and
    an inert metal dendrite target comprised of a second segment of exposed inert conductive metal coupled mechanically and electrically to the anode; wherein the position of said first segment of inert metal coupled to the cathode and the position of said second segment of inert metal coupled to the anode are such that said first segment and said second segment face each other and are held in physical separation by the separator, whereby during voltage reversal a dendrite will grow from said first segment toward said dendrite target and come in contact with said dendrite target.

2. The cell recited in claim 1 wherein said anode is comprised of an alkali or alkaline earth metal having a length substantially greater than width;
    wherein said cathode is comprised of a cathode material compressingly adhered to a conductive metal grid and said cathode has a length substantially greater than width;
    wherein said anode and said cathode have lengths such that the cathode is longer than the anode, such that when said anode, cathode, and separator are spirallly wound together a length of anode protrudes from between a first and a second outermost spirals of cathode, said protruding length being no greater than 25% of the circumference of the cell, and said protruding length being the location of said dendrite target.

3. The cell recited in claim 2 wherein said first segment of inert metal coupled to the cathode is an exposed segment, on just one side of the cathode, of the conductive metal grid, said area of exposure being no greater than 5%, but not less than 1%, of the cathode surface area on that side of the cathode.

4. The cell recited in claim 3 wherein said dendrite target of inert metal coupled to the anode is comprised of a strip of metal positioned so that its lengthwise direction is perpendicular to the lengthwise direction of the anode, said target having a thickness greater than 1 mil but less than one half the thickness of the cathode, said target also functioning as an anode tab for connection to the negative terminal of the cell.

5. The cell recited in claim 4 wherein said dendrite target coupled to the anode is selected from the group consisting of nickel, nickel plated cold rolled steel, copper, stainless steel, and cold rolled steel.

6. The cell recited in claim 3 wherein said dendrite target of inert metal coupled to the anode is comprised of a piece of metal having an area not greater than 5% of the anode surface area but less than the surface area of the exposed metal grid of the cathode, said target having a thickness greater than 1 mil but less than one half the thickness of the cathode, said target fixed onto the surface of the anode such that it does not extend beyond any edge of the anode, and located behind and aligned with said target on the other side of the anode is an anode tab.

7. The cell recited in claim 6 wherein said dendrite target coupled to the anode is selected from the group consisting of nickel, nickel plated cold rolled steel, copper, stainless steel, and cold rolled steel.

8. The cell recited in claim 6 wherein the anode is comprised of lithium and the nonaqueous electrolyte comprises a cathode active material of $SO_2$.

9. The cell recited in claim 3 wherein the conductive metal grid is comprised of a metal selected from the group consisting of metals or alloys that form an alloy with lithium.

10. The cell recited in claim 3 wherein the conductive metal grid is comprised of a metal selected from the group consisting of titanium, tantalum, niobium, aluminum, stainless steel, or nickel.

11. The cell recited in claim 3 wherein the anode is lithium or alloys thereof.

12. The cell recited in claim 3 wherein the cathode material is selected from the group consisting of carbons, metal oxides, carbon fluorides, metal sulfides, transition metal polysulfides, metal halides, and mixtures thereof.

13. The cell recited in claim 3 wherein the cathode material is selected from the group consisting of $MnO_2$, $CF_x$, $V_2O_5$, $WO_3$, $MoO_3$, $MoS_2$, lead oxides, cobalt oxides, copper oxides, $CuS$, $CuS_2$, $In_2O_3$, iron sulfides, $NiS$, $Ag_2CrO_4$, $Ag_3PO_4$, $TiS_2$, transition metal polysulfides, $CoCl_2$, $NiCl_2$, $FeBr_3$, $PbCl_2$, $CuCl_2$, $CuBr_2$, and mixtures thereof.

14. The cell recited in claim 3 wherein the cathode material is comprised of carbon and the nonaqueous electrolyte comprises a cathode active material selected from the group consisting of $SO_2$, $SOCl_2$, and $SO_2Cl_2$.

15. The cell recited in claim 1 wherein the anode is comprised of lithium and the nonaqueous electrolyte comprises a cathode active material of $SO_2$.

* * * * *